United States Patent
Sankuratripati et al.

(10) Patent No.: US 11,537,746 B2
(45) Date of Patent: *Dec. 27, 2022

(54) PRIVACY APPROVAL SYSTEM

(71) Applicant: Snap Inc., Santa Monica, CA (US)

(72) Inventors: Subhash Sankuratripati, Playa Vista, CA (US); Dhanuja Shaji, Marina Del Rey, CA (US); Masoud Akhoondi, Los Angeles, CA (US); Amit Datta, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/462,671

(22) Filed: Aug. 31, 2021

(65) Prior Publication Data

US 2021/0397741 A1 Dec. 23, 2021

Related U.S. Application Data

(63) Continuation of application No. 16/354,410, filed on Mar. 15, 2019, now Pat. No. 11,126,745.

(51) Int. Cl.
*G06F 3/048* (2013.01)
*G06F 21/62* (2013.01)
(Continued)

(52) U.S. Cl.
CPC ........ *G06F 21/6245* (2013.01); *G06F 3/0482* (2013.01); *G06F 9/451* (2018.02); *G06F 2203/04803* (2013.01); *G06Q 30/018* (2013.01)

(58) Field of Classification Search
CPC ..... G06F 3/0482; G06F 9/451; G06F 21/6245
See application file for complete search history.

(56) References Cited

U.S. PATENT DOCUMENTS

2004/0119752 A1\* 6/2004 Beringer .......... G06Q 10/06313
715/779
2011/0023851 A1 9/2011 Rowen et al.
(Continued)

OTHER PUBLICATIONS

"U.S. Appl. No. 16/354,410, Final Office Action dated Mar. 18, 2021", 27 pgs.
(Continued)

*Primary Examiner* — Claudia Dragoescu
(74) *Attorney, Agent, or Firm* — Schwegman Lundberg & Woessner, P.A.

(57) ABSTRACT

Aspects of the present disclosure involve a system comprising a computer-readable storage medium storing a program and a method for determining whether data utilization is privacy compliant. The program and method includes receiving input, via a graphical user interface, that includes identification of an application feature that utilizes user data collected from a plurality of users of the application; generating, for display in the graphical user interface, a plurality of fields that characterize utilization of user data; receiving, via the graphical user interface, a selection of one or more fields, the selected one or more fields characterize the utilization of the user data by the application feature; determining, based on the selected one or more fields, whether the utilization of the user data is privacy compliant; and generating, for display, an approval status indicating whether the utilization of the user data is privacy compliant.

20 Claims, 10 Drawing Sheets

(51) Int. Cl.
    *G06F 9/451*     (2018.01)
    *G06F 3/0482*     (2013.01)
    *G06Q 30/00*     (2012.01)

(56) References Cited

U.S. PATENT DOCUMENTS

| | | | |
|---|---|---|---|
| 2011/0238510 A1* | 9/2011 | Rowen | G06V 40/382 |
| | | | 705/16 |
| 2016/0246991 A1* | 8/2016 | Bell | G06F 21/6245 |
| 2017/0249306 A1 | 8/2017 | Allen et al. | |
| 2018/0096165 A1* | 4/2018 | Warshavsky | G06F 16/2282 |
| 2018/0137305 A1* | 5/2018 | Barday | G06F 21/6245 |

OTHER PUBLICATIONS

"U.S. Appl. No. 16/354,410, Non Final Office Action dated Nov. 25, 2020", 22 pgs.

"U.S. Appl. No. 16/354,410, Notice of Allowance dated May 24, 2021", 9 pgs.

"U.S. Appl. No. 16/354,410, Response filed Feb. 11, 2021 to Non Final Office Action dated Nov. 25, 2020", 11 pgs.

"U.S. Appl. No. 16/354,410, Response filed Apr. 29, 2021 to Final Office Action dated Mar. 18, 2021", 11 pgs.

\* cited by examiner

PRIVACY APPROVAL SYSTEM

This application is a continuation of and claims the benefit of priority of U.S. patent application Ser. No. 16/354,410, filed Mar. 15, 2019, which is hereby incorporated by reference in its entirety

TECHNICAL FIELD

The present disclosure relates generally to privacy management of user data.

BACKGROUND

Modern day service providers typically collect a variety of information from users to provide different services. The information that is collected can be used for the specific transaction the user intends to perform with the service provider as well as ancillary services. For example, a user may provide personal information (e.g., sensitive data, including credentials such as credit card numbers, debit card numbers and bank account numbers, and personally identifying information such as social security numbers, names and addresses) to access a given content delivery service and such information can subsequently be used by the content delivery service to run statistics or provide recommendations to the user. While the collection and analysis of such data can be of great benefit not only to the particular user but to other users of the service provider, it can also be the subject of considerable abuse, such as provision of the information to a third party. Such abuse can prevent many otherwise cooperative users from accessing and providing information to the service providers. For these reasons, as well as privacy regulations or regulatory constraints, when personal information is stored in databases, it is incumbent on service providers that control this data to protect the data from abuse.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
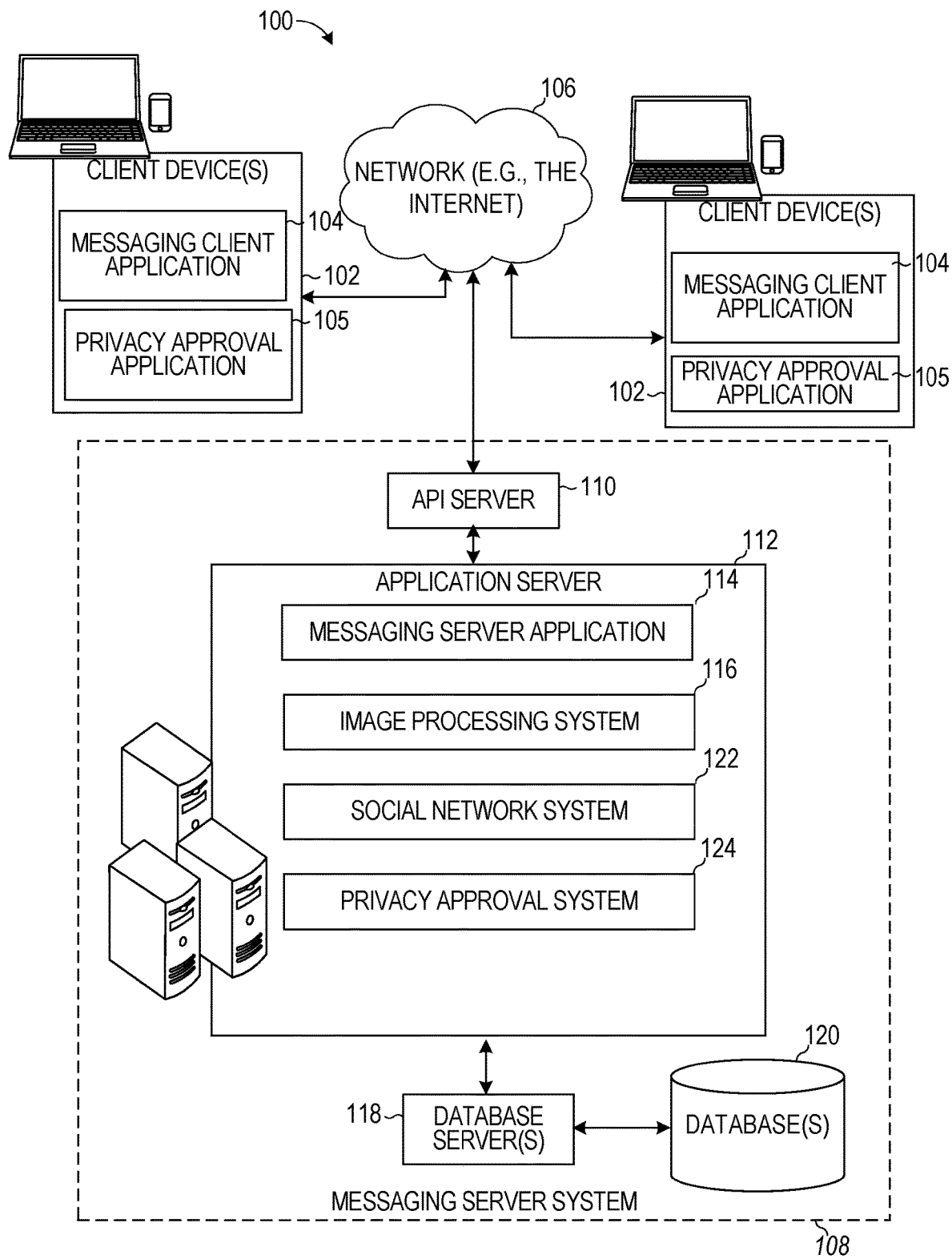
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Typical systems verify compliance with data privacy regulations through an unstructured manual process. As a new application feature is created for the systems, which operates on previously collected user data, a software developer fills out a questionnaire with generic answers about how the new feature operates on the previously collected user data. The answers to the questionnaire are reviewed by compliance officers to verify whether the specified use of the user data by the new feature satisfies privacy regulations and is thus authorized. However, because the questionnaire is very open ended, the way in which different software developers fill out the information varies even for the same use of the data. This results in different compliance result outcomes and inconsistencies across the system. Also, the manual nature of the systems and the lack of a centralized and structured storage for the answers to the privacy data questionnaires and resulting outcomes, burdens the compliance officers and the software developers and introduces long delays in approving or disapproving the newly created application feature for release. This can further slow down and bottleneck further feature development or other tools that rely on the new feature which ends up frustrating end users.

The disclosed embodiments improve the efficiency of using the electronic device by providing a graphical user interface and database for simplifying and automating data privacy compliance. The graphical user interface simultaneously presents information about a new application feature for which privacy approval is requested, information characterizing utilization of previously collected user data, and approval status in different regions. This allows a requesting user (e.g., a software developer) and approving users (e.g., a compliance officer) the ability to review and provide all the information that is needed to approve the new application feature as being privacy compliant. Namely, rather than paging through multiple screens to view different sets of information, the users can see in one place all the information they need which improves the efficiency and operation of the computing device. Also, the disclosed embodiments provide a privacy compliance platform that integrates privacy compliance requests, submitted through a privacy compliance application with a documentation system through which documentation about the application feature is provided. Namely, rather than a software developer having to navigate between different applications (e.g., one for submitting a privacy compliance request and another for providing documentation), the software developer can perform both tasks, and other data privacy related tasks, through a single integrated graphical user interface provided by the privacy compliance platform.

According to some embodiments, the graphical user interface is accessed by a given user, such as a software developer, to supply information about a new application feature that has been developed. The information indicates how the new application feature will utilize previously collected user data. To structure and provide consistency across different software developers requesting privacy approvals, the information is provided by selecting specified or predetermined fields and menus (rather than filling out a generic questionnaire) that characterize utilization of the user data. After the specified or predetermined fields are selected, the new application feature and its associated selected fields that characterize how the new application feature utilizes previously collected user data is stored in a database. A compliance officer, such as privacy engineer or legal personnel, is immediately or promptly electronically notified about the new feature for which privacy compliance is requested. The compliance officer accesses the graphical user interface and determines whether the selected fields indicating how the new application feature utilizes previously collected user data is privacy compliant. The compliance officer updates an approval status of the new application feature to instantly or promptly electronically notify the given user about whether the new application feature is authorized to utilize the user data in the specified manner. By providing the graphical user interface to structure the information indicating how user data is utilized and provide approval status for new features, approval of new application features is streamlined and expedited which increases the efficiency of the system.

In some embodiments, the approval of the way in which a new application feature utilizes previously collected user data indicating it to be privacy compliant is performed automatically. Specifically, after the given user provides the information about how the new application feature utilizes the previously collected user data, the system automatically processes the supplied information to approve or deny the use. This is performed without involving a privacy compliance officer. In particular, the system compares the information indicating how the new application feature utilizes the previously collected user data to previously approved uses. Based on this comparison, the system automatically generates a risk score indicating a likelihood that utilization of the user data is privacy compliant. The risk score can be based on how many of selected fields characterizing use of the information by the new application feature match previously selected fields of other application features that have been approved. In response to determining that the risk score corresponds to a given threshold (e.g., the risk score is less than a given amount), the system automatically sets the approval status to approved without involving or notifying the compliance officer. This further expedites and streamlines the approval of new application features and increases the overall efficiency of the system.

In some embodiments, to further enhance the speed and simplicity for approving a new application feature as being privacy compliant, a unique privacy identifier is associated with the information, such as the selected fields characterizing utilization of the user data, provided by the given user for the new application feature. When the given user subsequently creates another new feature that has some of the same type of utilization of the user data, the unique privacy identifier can be input to the graphical user interface. This results in the previously supplied information to be imported from the database and automatically prepopulated into the graphical user interface. The given user can then simply make appropriate changes to certain of the information characterizing the newly created feature's utilization of the data. This reduces the number of steps and screens the given user has to navigate through to request compliance review of the newly created feature and thereby enhances the overall efficiency of the system and expedites the approval process. Also, the integrated privacy compliance platform reduces the number of different applications a software developer has to access and launch to generate privacy compliance requests which enhances the overall efficiency of the system by reducing the number of resources used to request and approve data privacy for a new application feature.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104 and a privacy approval application 105. Each messaging client application 104 is communicatively coupled to other instances of the messaging client application 104, the privacy approval application 105, and a messaging server system 108 via a network 106 (e.g., the Internet). Messaging client application 104 may, in some embodiments, be a software developer tool used to provide documentation for a new application feature to be used in a messaging client application or other application. In such cases, the messaging client application 104 may be combined with the privacy approval application 105.

Accordingly, each messaging client application 104 and privacy approval application 105 is able to communicate and exchange data with another messaging client application 104 and privacy approval application 105 and with the messaging server system 108 via the network 106. The data exchanged between messaging client applications 104, privacy approval applications 105, and between a messaging client application 104 and the messaging server system 108 includes functions (e.g., commands to invoke functions) as well as payload data (e.g., text, audio, video, or other multimedia data). The privacy approval application 105 may only be included in the client device 102 when the client device 102 is a device associated with an operator or software developer or compliance officer of the messaging system 100. Specifically, the privacy approval application 105 may be excluded or be inaccessible to the client device 102 of an end user of the messaging system 100.

The privacy approval application 105 is an application that includes a set of functions that allow the client device 102 to access the privacy approval system 124. In some implementations, the privacy approval application 105 is a component or a feature that is part of the messaging client application 104. Privacy approval application 105 allows a first user, such as a software developer, to request privacy compliance approval for a new application feature. The privacy compliance approval request corresponds to requesting authorization for the new application feature (e.g., a new software feature or a revised software feature of a messaging client application 104) to operate, use, consume, aggregate, combine, display, collect new user data or utilize in some manner previously collected user data. The privacy approval application 105 generates for display a graphical user interface that includes a plurality of fields allowing the user to supply information indicating how the new application feature utilizes the previously collected user data.

After the information is supplied, the information is saved in a database and a notification is sent to the privacy approval application 105 on a second client device 102 for a second user, such as a compliance officer (legal compliance officer or privacy engineer), to review and make a determination as to whether the use of the previously collected user data as indicated by the selected fields is privacy compliant. The second user reviews the information provided by the software developer through the graphical user interface and approves or denies the specified use by selecting one or more indicators on the graphical user interface. After the second user completes the review, the approval status of the new application feature is updated indicating whether the utilization of the user data by the new application feature is approved or denied. A notification is sent to the first user for display on the client device 102 of the first user using the privacy approval application 105. The notification indicates to the first user the approval status in the graphical user interface.

In some embodiments, before notifying the second user (e.g., the privacy compliance officer) about the request to approve the new application feature, the privacy approval application 105 automatically computes a risk score for the selected fields characterizing utilization of the user data. Based on the computed risk score, the privacy approval application 105 automatically approves or denies privacy compliance of the new application feature. Specifically, after the first user provides the information about how the new application feature utilizes the previously collected user data, the privacy approval application 105 automatically processes the supplied information to approve or deny the use. This is performed without involving the second user. In particular, the privacy approval application 105 compares the information indicating how the new application feature utilizes the previously collected user data to previously approved uses. Based on this comparison, the privacy approval application 105 automatically generates a risk score indicating a likelihood that utilization of the user data is privacy compliant. The risk score can be based on how many of selected fields characterizing use of the information by the new application feature match previously selected fields of other application features that have been approved. In response to determining that the risk score corresponds to a given threshold (e.g., the risk score is less than a given amount), the privacy approval application 105 automatically sets the approval status to approved without involving or notifying the compliance officer. A notification is sent to the first user for display on the client device 102 of the first user using the privacy approval application 105 indicating instantly or promptly to the first user the automatically generated approval status in the graphical user interface.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application program interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the messaging server application 114, and for possible access by another messaging client application 104; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the privacy approval system 124. In some implementations, all of the applications hosted by the application server 112, including functionality of application server 112, are implemented by the privacy approval system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the privacy approval system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends. Social network system 122 may access location information associated with each of the user's friends to determine where they live or are currently located geographically. Social network system 122 may maintain a location profile for each of the user's friends indicating the geographical location where the user's friends live.

The application server 112 is communicatively coupled to a database server 118, which facilitates access to a database 120 in which is stored data associated with messages processed by the messaging server application 114. Database 120 may be a third party database. For example, the application server 112 may be associated with a first entity and the database 120 or a portion of the database 120 may be associated and hosted by a second different entity. In some implementations, database 120 stores user data that the first entity collects about each of the users of a service provided by the first entity. For example, the user data includes user names, passwords, addresses, friends, activity information, preferences, videos or content consumed by the user, and so forth. The data may be provided by the users voluntarily or may be collected automatically by the first entity and stored in database 120. In some implementations, the data is provided by the user for using a particular function of the service provided by the first entity. In some cases, this same data can be used by another new function or feature or service provided by the first entity. The user may or may not be interested in the new function or feature or server provided by the first entity and accordingly there may be restrictions on the way in which the user's data can be used without express permission by the user. These uses are typically controlled and regulated according to privacy regulations.

Figure 2:
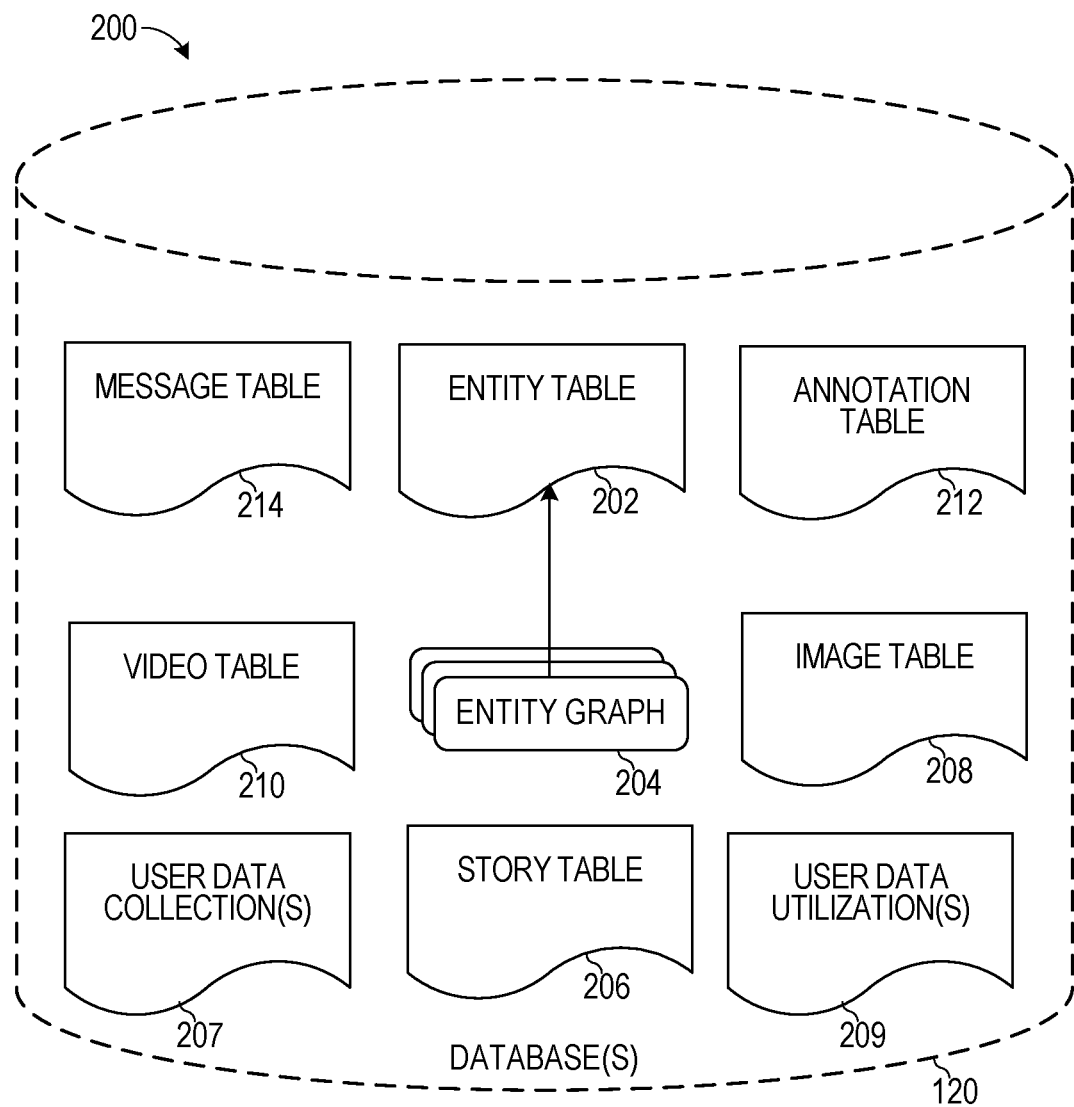
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 furthermore stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

User data collection(s) 207 stores previously collected data about a plurality of users of the application server 112. Such data includes any personal information supplied by the plurality of users and interaction data about the users. For example, the data represents which videos or content each of the users has watched or consumed and for how long the content was consumed. The data represents any one of avatar characteristics of each user, a current location of each user, demographic information about each user, a list of each user's friends on a social network system 122, each user's date of birth, credit card numbers, social security numbers, how often each user accesses the messaging client application 104, pictures and videos captured by one or more user devices of each user, and/or any combination thereof.

User data utilization(s) 209 may store a database 120 characterizing how user data collection(s) 207 is utilized by one or more application features of applications provided by application server 112 (e.g., messaging client application 104). Such utilization information includes, for each application feature, whether the utilization has been authorized as being privacy compliant using an approval status field. Utilization includes the way in which each application feature operates, uses, consumes, aggregates, combines, displays, collects new user data or utilizes in some manner previously collected user data. Data including which fields are selected characterizing use of the application, unique identifiers of each privacy approval request for an application feature, and approval status provided by and/or to one or more users of the privacy approval application 105 via the graphical user interface is included in user data utilization(s) 209.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
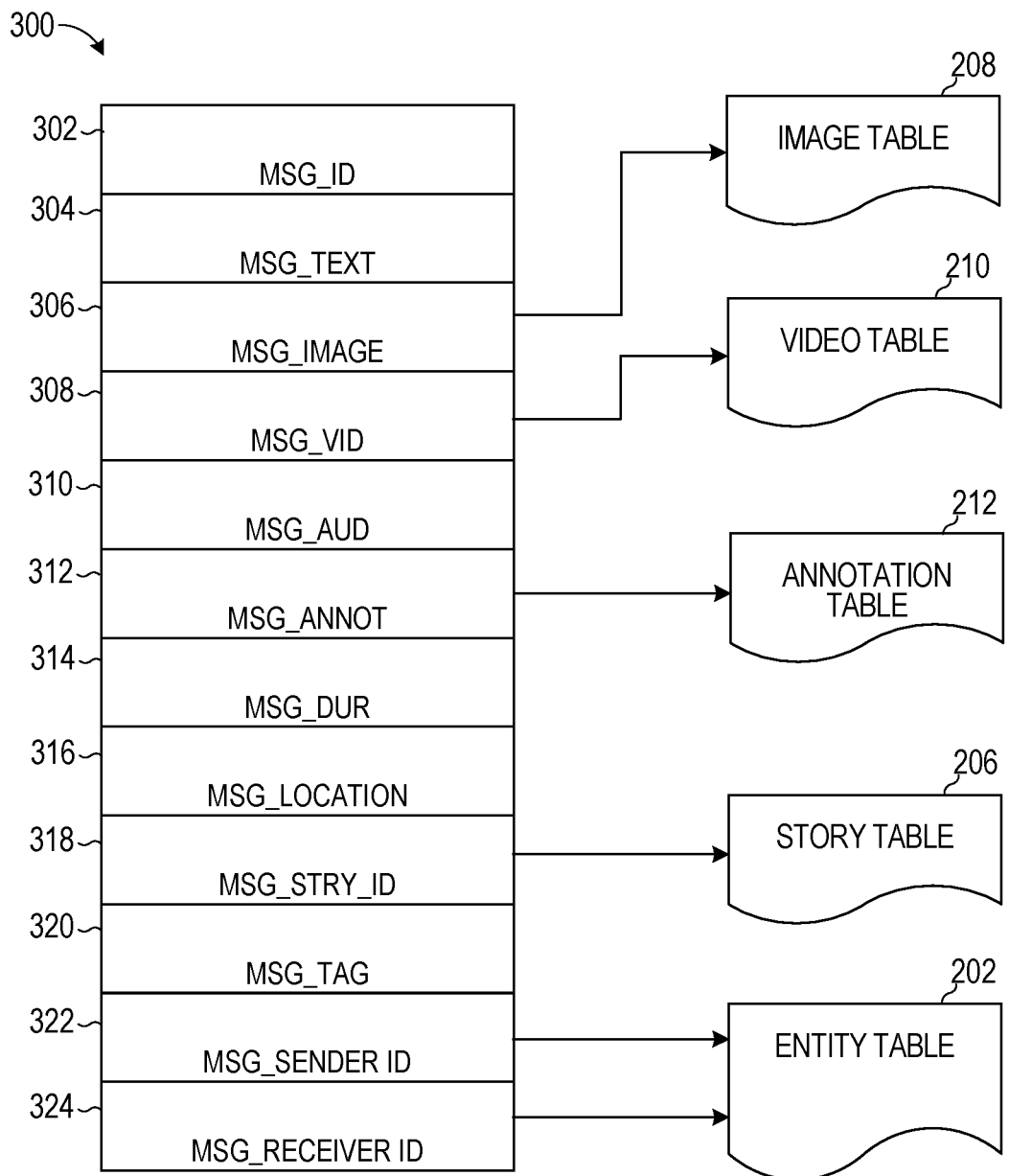
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

Message annotations 312: annotation data (e.g., filters, stickers, or other enhancements) that represents annotations to be applied to message image payload 306, message video payload 308, or message audio payload 310 of the message 300.

A message duration parameter 314: parameter value indicating, in seconds, the amount of time for which content of the message 300 (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message 300. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
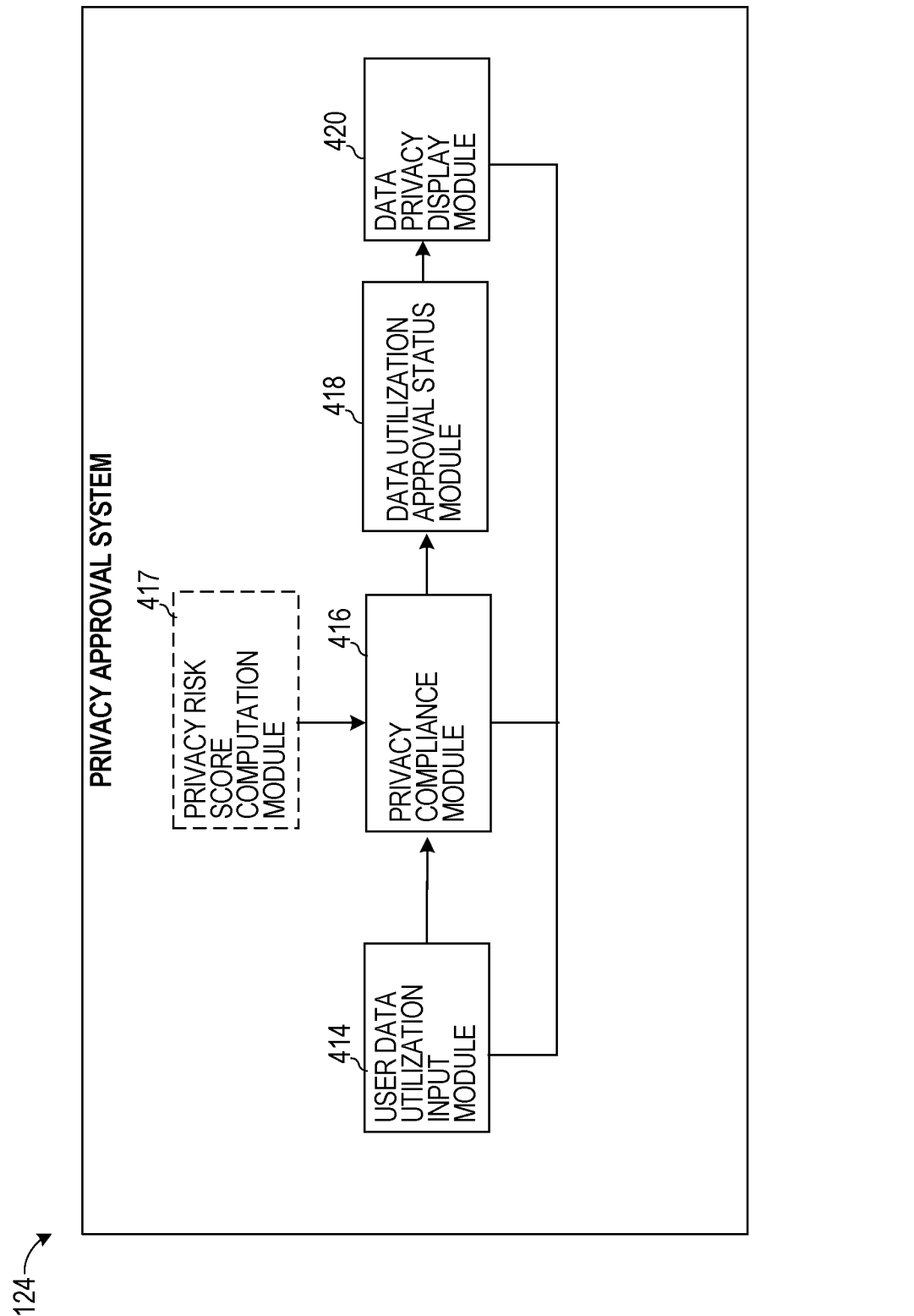
FIG. 4 is a block diagram showing an example privacy approval system, according to example embodiments.

FIG. 4 is a block diagram showing an example privacy approval system 124, according to example embodiments.

Privacy approval system 124 includes user data utilization input module 414, privacy compliance module 416, data utilization approval status module 418, data privacy display module 420, and privacy risk score computation module 417. User data utilization input module 414 operates with data privacy display module 420 to present a graphical user interface to a first user (e.g., a software developer) on a client device 102 using the privacy approval application 105. For example, the user data utilization input module 414 initially presents a screen 600 (FIG. 6) allowing the first user to identify a given new application feature for which privacy approval is being requested. The first user provides a unique identifier of the new application feature by inputting a string of characters in text entry region 602.

Figure 7:
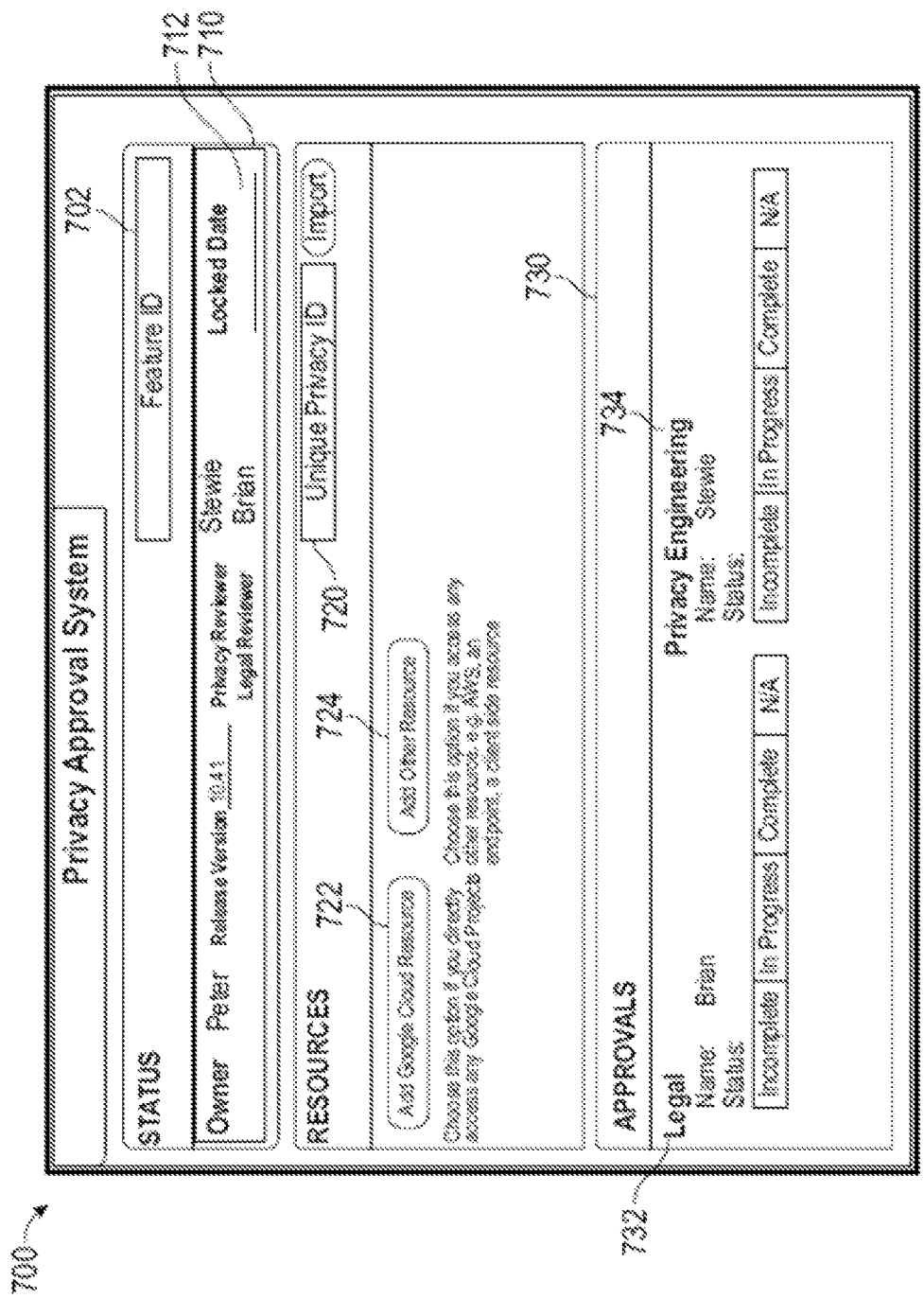

In response to the user data utilization input module 414 receiving the unique identifier of the new application feature in text entry region 602, the user data utilization input module 414 retrieves bibliographic information stored in a database 120 about the new application feature. The user data utilization input module 414 presents the retrieved information in a graphical user interface shown in screen 700 (FIG. 7). For example, the user data utilization input module 414 presents the unique identifier of the new application feature in the feature ID section 702. The user data utilization input module 414 presents the retrieved bibliographic information (e.g., the name of the first user, the release version, the size, the date of creation, and so forth) in a first portion 710 of the graphical user interface.

Figure 8:
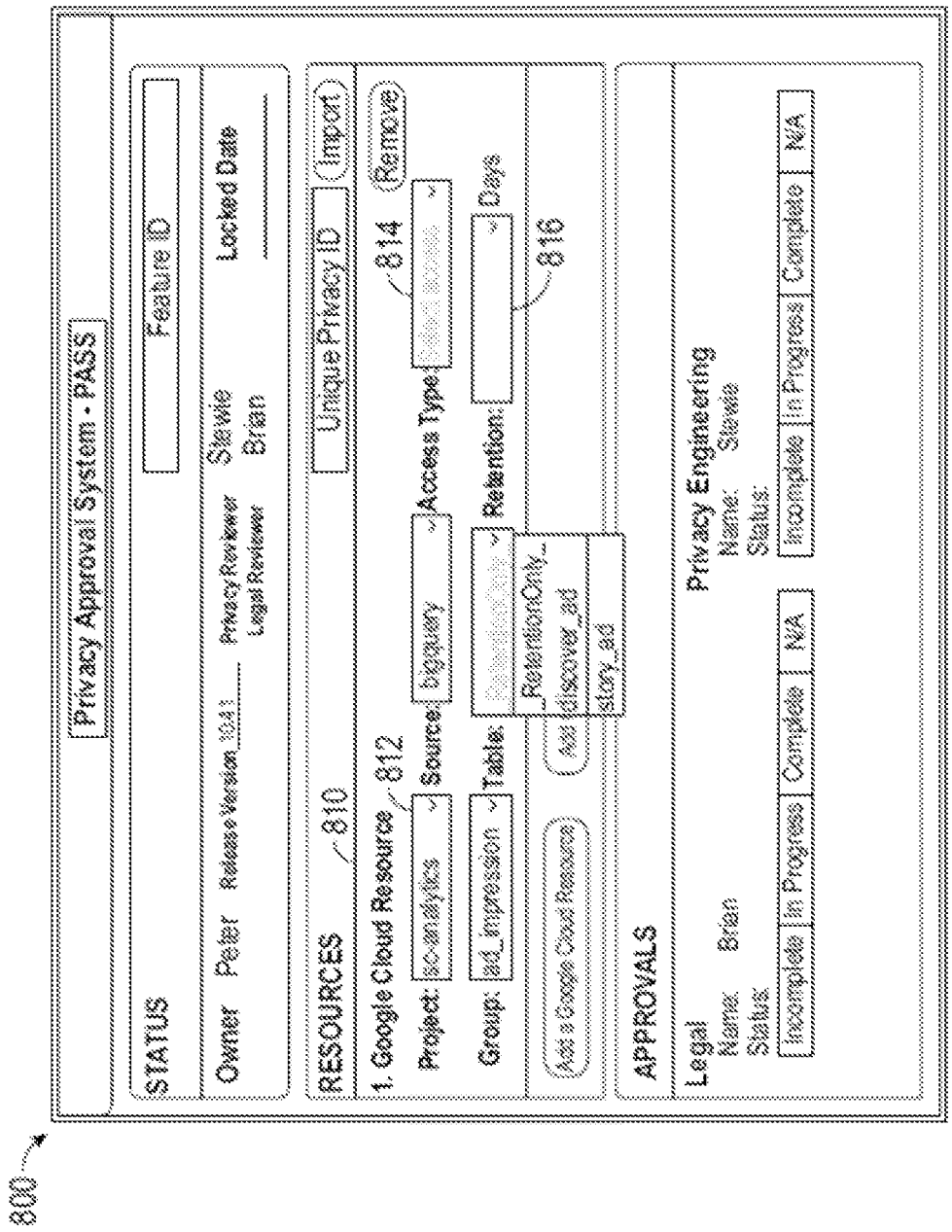

The first user may supply information characterizing how the new application feature utilizes the previously collected user data of user data collection(s) 207 by selecting between a given set of specified or predetermined fields. For example, if the user data collection(s) 207 are stored on a particular third-party storage location (e.g., Google Cloud Resource), the first user selects option 722 in the resource section of the graphical user interface. In response to receiving the first user selection of option 722, a second portion 810 of the graphical user interface is presented to the user in screen 800 (FIG. 8). The second portion 810 includes a plurality of fields characterizing utilization of the data stored in the particular third-party storage location. For example, the second portion 810 includes a first field 812 including options allowing the first user to specify a particular type of the previously collected user data that is utilized by the new application feature. Specifically, the first field 812 allows the user to specify whether the collected user data that is utilized includes images or videos captured by users, personal information about the users, interaction information or any other type characterizing which subset of previously collected user data is utilized by the new application feature.

The second field 814 includes options allowing the first user to specify how the data type selected by field 812 is used by the new application feature. For example, the second field 814 includes any combination of uses, such as retrieving, modifying, displaying, operating on, or any other type of data utilization that can be performed by the new application feature on the previously collected user data type.

The third field 816 includes options allowing the first user to specify how long the data type selected by field 812 will be retained or utilized by the new application feature. For example, if the new application feature retrieves any of the previously collected user data from storage on the third-party storage location, the third field 816 indicates how long the new application feature will keep the retrieved data before automatically discarding or deleting the data.

Referring back to FIG. 7, in some embodiments, the previously collected user data is in a storage location that is not listed in the set of resources on the graphical user interface. For example, the option 722 does not correspond to a storage location of the previously collected user data that is utilized by the new application feature. In such circumstances, the first user can select the 'add other resource' option 724. In response to receiving the selection of the 'add other resource' option 724, an interface similar to second portion 810 is presented to the first user. The interface may include options allowing the first user to specify the storage location of the previously collected user data and the way in which the previously collected user data is utilized. In some implementations, the first user may select multiple sources from which previously collected user data is utilized by the new application feature. For example, the first user can first select the option 722 to specify the utilization of the previously collected user data from the particular third-party storage location and can then also select the 'add other resource' option 724 to specify an additional storage location of previously collected user data.

In some implementations, the new application feature utilizes previously collected user data in a similar manner as a different application feature for which a data privacy request was previously submitted. In such circumstances, the first user may obtain the unique identifier of the prior submitted data privacy request. The first user may input the unique identifier into the unique privacy ID field 720 and select an import option. In response to the user selecting the import option, the user data utilization input module 414 may access the user data utilization(s) 209 storage and retrieve the fields characterizing the utilization by the different application feature. The user data utilization input module 414 then automatically populates all the fields in the second portion 810 for the new application feature with the retrieved fields previously selected for the prior application feature. If the new application feature uses the same type of data, the first field 812 and the second field 814 may be left unchanged by the first user. If the new application feature retains previously collected user data for a longer or shorter period of time than the prior application feature, the first user modifies the retention period specified in the third field 816. The information provided in the second portion 810 is automatically saved.

Referring back to FIG. 4, after the first user completes selecting fields characterizing utilization of the previously collected user data by the new application feature in the graphical user interface, the first user selects an option (not shown) to request to have the new application feature's utilization of the previously collected user data reviewed. In response to selection of this option, the user data utilization input module 414 sends a communication to the privacy compliance module 416 to review the selected set of fields characterizing utilization of the previously collected user data. In some implementations, in response to selection of the option to request to have the utilization reviewed, the first and second portions 710/810 of the graphical user interface enter a locked status and the date and time at which the first and second portions 710/810 of the graphical user interface enter the locked status is indicated in field 712. When the first and second portions 710/810 of the graphical user interface enter the locked status, the data associated with the fields in the first and second portions 710/810 enters a read-only status preventing the first user from modifying the information. In this way, after the first user completes providing the information specifying the utilization of the previously collected user data by the new application feature and requests that the information be reviewed by the privacy compliance module 416, the data cannot be modified by the first user during the review process.

The privacy compliance module 416 electronically notifies one or more privacy compliance officers (e.g., a second user) and/or automatically approves of denies privacy compliance of the new application feature. In some embodiments, the privacy compliance module 416 communicates with privacy compliance module 416 to obtain a risk score indicating a likelihood of privacy compliance by the new application feature. If the risk score is below a certain threshold (e.g., less than 15%) (e.g., indicating a low likelihood that the utilization of the previously collected user data is not privacy compliant or indicating that a high likelihood that the utilization of the previously collected user data is privacy compliant), the privacy compliance module 416 updates an approval status of the new application feature indicating that the new application feature is approved as being privacy compliant automatically. If the risk score is above the certain threshold (e.g., more than 15%) (e.g., indicating a high likelihood that the utilization of the previously collected user data is not privacy compliant or indicating that a low likelihood that the utilization of the previously collected user data is privacy compliant), the privacy compliance module 416 electronically notifies the second user to review the selected fields to determine whether the utilization is privacy compliant. This automatically generated approval status or the approval status provided by the second user is provided to the data utilization approval status module 418.

In some implementations, the privacy compliance module 416 provides, to the privacy risk score computation module 417, the selected set of fields the first user selected in the graphical user interface that characterize utilization of the previously collected user data by the new application feature. The privacy risk score computation module 417 retrieves from a database 120 a list of combinations of fields of application features for which the approval status indicates that the utilization was previously approved. The privacy risk score computation module 417 compares the combination of the information provided in the selected set of fields of the new application feature to the retrieved combination of fields of other application features for which the approval status indicates that the utilization was previously approved. A risk score is generated based on the number of fields between the new application feature and the other application features that match. If the combination of the information provided in the selected set of fields of the new application feature matches more than a threshold number of the combination of the fields from the other applications, a low risk score is generated. If the combination of the information provided in the selected set of fields of the new application feature matches less than the threshold number of the combination of the fields from the other applications, a high risk score is generated. The risk score indicates a likelihood that the utilization by the new application feature is privacy compliant.

In some implementations, the privacy risk score computation module 417 correlates the selected set of fields of the new application feature with the fields characterizing utilization of the previously collected user information from the other application to generate the risk score. Specifically, the privacy risk score computation module 417 determines how many of the other application features that were previously approved utilize the previously collected user information in a similar manner as the new application feature. If the number of other application features that utilize the previously collected user information in a similar manner as the new application feature exceeds a certain threshold, a low risk score is generated for the new application feature. If the number of other application features that utilize the previously collected user information in a similar manner as the new application feature is below the certain threshold, a high risk score is generated for the new application feature.

As an example, the privacy risk score computation module 417 may determine that the new application feature includes a field selected indicating the type of previously collected user information that is used includes images, videos, and current locations. The privacy risk score computation module 417 may determine that previously approved applications included fields selected indicating the type of previously collected user information that was used includes images and current locations. The privacy risk score computation module 417 may, in this case, determine that only one of the fields is in the new application feature (e.g., videos) but is missing from the previously approved applications' fields. The privacy risk score computation module 417 may determine that an assigned priority of the video field is below a certain threshold (indicating it is a low priority or not very sensitive information field) and, as such, may compute a score that represents a 15% risk (indicating a high likelihood that the new application feature is privacy compliant). Alternatively, the privacy risk score computation module 417 may determine that the assigned priority of the video field is above a certain threshold (indicating it is a high priority or very sensitive information field) and as such may compute a score that represents a 75% risk (indicating a low likelihood that the new application feature is privacy compliant).

As an example, the privacy risk score computation module 417 may determine that the new application feature includes a field selected indicating the type of previously collected user information that is used includes images, videos, telephone numbers, contacts, and current locations. The privacy risk score computation module 417 may determine that previously approved applications included fields selected indicating the type of previously collected user information that was used includes images and current locations. The privacy risk score computation module 417 may, in this case, determine that three of the fields in the new application feature (e.g., videos, telephone numbers and contacts) are missing from the previously approved applications' fields. The privacy risk score computation module 417 may determine that three missing fields is more than a threshold of two fields of matching fields, and, as such, may compute a score that represents a 99% risk (indicating a very low likelihood that the new application feature is privacy compliant).

In some implementations, the privacy risk score computation module 417 determines automatically whether the retention period specified in the selected set of fields of the new application feature is less than a certain threshold to generate the risk score. If the retention period specified in the selected set of fields exceeds a certain threshold, a high risk score is generated for the new application feature. If the retention period specified in the selected set of fields is below the certain threshold, a low risk score is generated for the new application feature. A high risk score indicates a greater likelihood that the application feature's utilization of the previously collected user data is not privacy compliant. A low risk score indicates a greater likelihood that the application feature's utilization of the previously collected user data is privacy compliant.

The privacy compliance module 416 electronically notifies the second user (e.g., a privacy compliance officer, such as a privacy engineer or legal personnel) to review the privacy compliance of the new application feature by presenting a third portion 730 of screen 700 (FIG. 7) in a graphical user interface. The second user can, in some implementations, be presented in the graphical user interface with the risk score computed by the privacy risk score computation module 417. The second user reviews the fields selected by the first user in the second portion 810 of the graphical user interface. The second user indicates whether the combination of the fields selected in the second portion 810 is privacy compliant in a legal portion 732 of the third portion 730 and updates the approval status of the new application feature in the graphical user interface (e.g., from in progress to complete and approved or denied). In some implementations, an additional privacy compliance officer also reviews the information and also updates the approval status of the new application feature in a privacy engineering portion 734 of the third portion 730 of the graphical user interface.

The data utilization approval status module 418 generates a notification that electronically notifies the first user when the approval status of the new application feature has been completed. The first user is presented with screen 700 and can review the approval status that was provided for the new application feature.

Figure 6:
FIGS. 6-8 are illustrative inputs and outputs of the privacy approval system, according to example embodiments.

The data privacy display module 420 can be used to present any of the interface screens of FIGS. 6-8. In some implementations, the data privacy display module 420 can be used to display a graphical user interface to review all of the privacy approvals and denials and all of the types of previously collected user data utilizations performed by one or more application features. Any database operation can be performed on the data to generate a list of the different types of utilizations of the previously collected user data by all of the application features, the number of application features which retain the previously collected user data for over a certain period of time, and/or any other data analysis and statistics operation.

Figure 5:
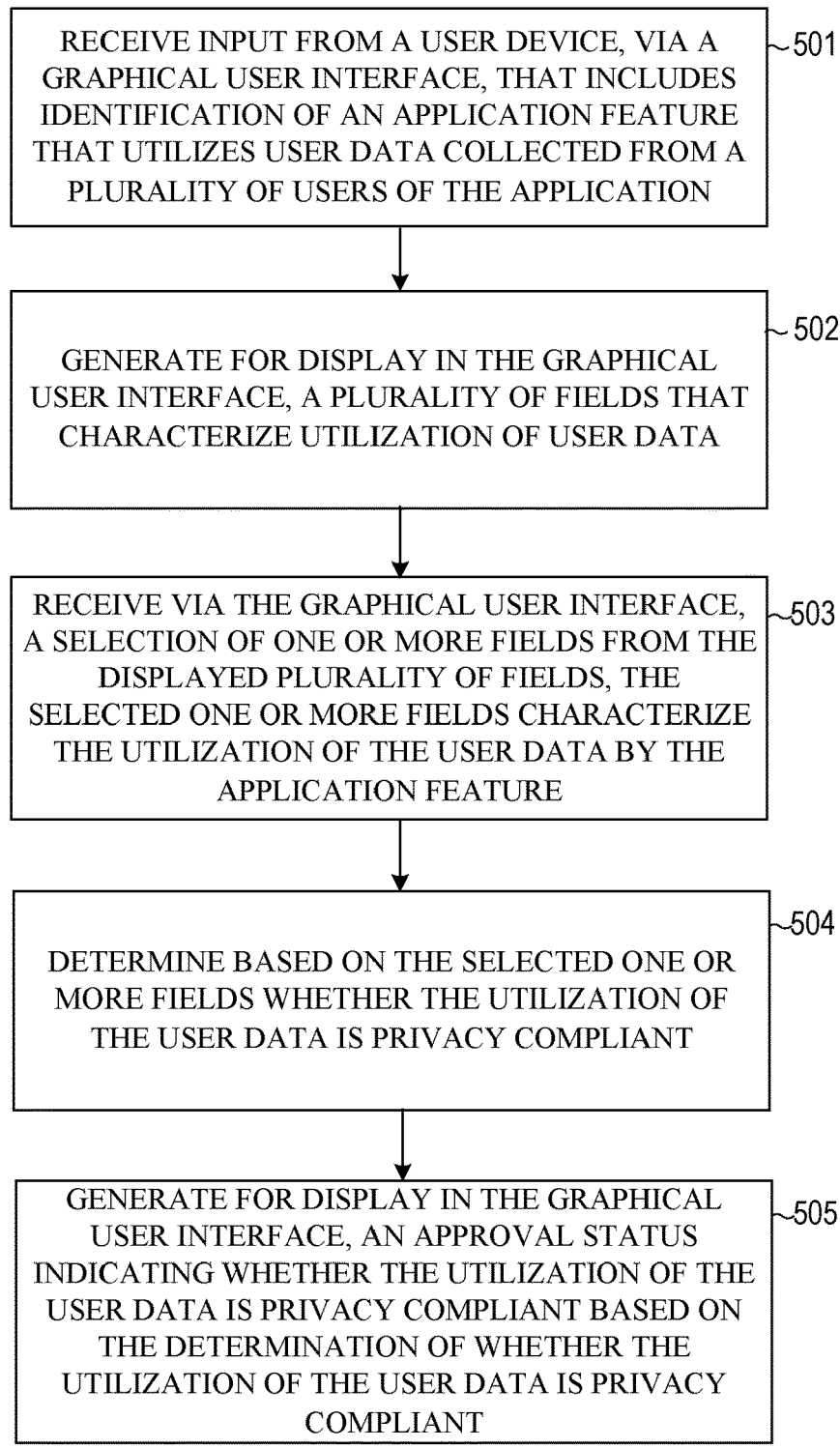
FIG. 5 is a flowchart illustrating example operations of the privacy approval system, according to example embodiments.

FIG. 5 is a flowchart illustrating example operations of the privacy approval system 124 in performing process 500, according to example embodiments. The process 500 may be embodied in computer-readable instructions for execution by one or more processors such that the operations of the process 500 may be performed in part or in whole by the functional components of the messaging server system 108 and/or privacy approval application 105; accordingly, the process 500 is described below by way of example with reference thereto. However, in other embodiments, at least some of the operations of the process 500 may be deployed on various other hardware configurations. The process 500 is therefore not intended to be limited to the messaging server system 108 and can be implemented, in whole or in part, by any other component. Some or all of the operations of process 500 can be in parallel, out of order, or entirely omitted.

At operation 501, the privacy approval system 124 receives input from a user device, via a graphical user interface, that includes identification of an application feature that utilizes user data collected from a plurality of users of the application. For example, user data utilization input module 414 receives input from a first user (e.g., a software developer) identifying a new application feature.

At operation 502, the privacy approval system 124 generates, for display in the graphical user interface, a plurality of fields that characterize utilization of user data. For example, the user data utilization input module 414 displays a plurality of fields in the second portion 810 (FIG. 8) of the graphical user interface characterizing utilization of the previously collected user data by the new application feature.

At operation 503, the privacy approval system 124 receives, via the graphical user interface, a selection of one or more fields from the displayed plurality of fields, the selected one or more fields characterize the utilization of the user data by the application feature. For example, the user data utilization input module 414 receives a selection of fields from second portion 810 (FIG. 8) characterizing utilization of the previously collected user data by the new application feature.

At operation 504, the privacy approval system 124 determines, based on the selected one or more fields, whether the utilization of the user data is privacy compliant. For example, the privacy compliance module 416 analyzes the selected set of fields input in second portion 810 to determine automatically and/or by receiving input from a second user (e.g., a compliance officer) whether the utilization is privacy compliant.

At operation 505, the privacy approval system 124 generates, for display in the graphical user interface, an approval status indicating whether the utilization of the user data is privacy compliant based on the determination of whether the utilization of the user data is privacy compliant. For example, the data utilization approval status module 418 generates a notification to the first user with the approval status indicating whether the utilization is approved or denied.

Figure 9:
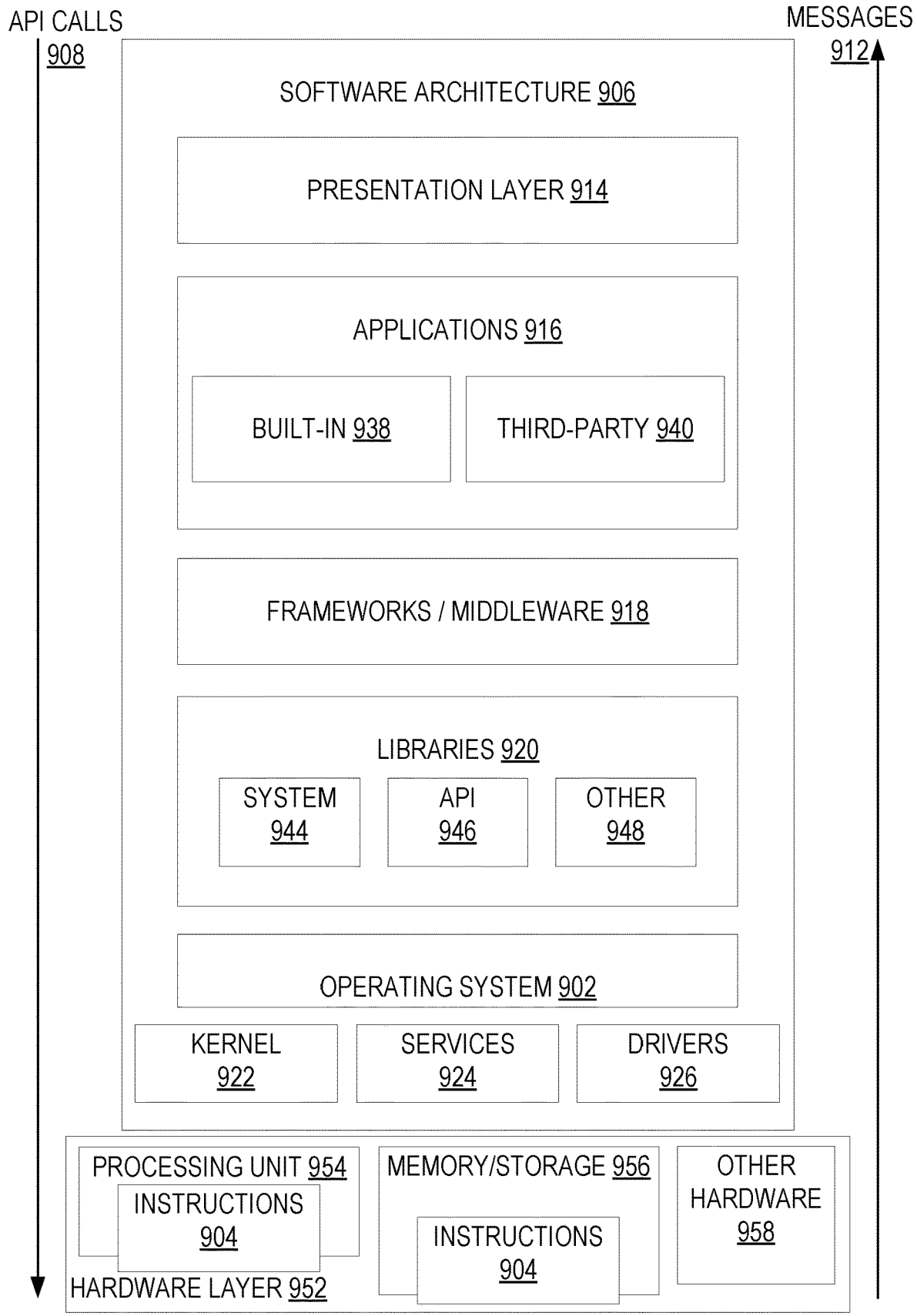
FIG. 9 is a block diagram illustrating a representative software architecture, which may be used in conjunction with various hardware architectures herein described, according to example embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and input/output (I/O) components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic UI (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built-in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
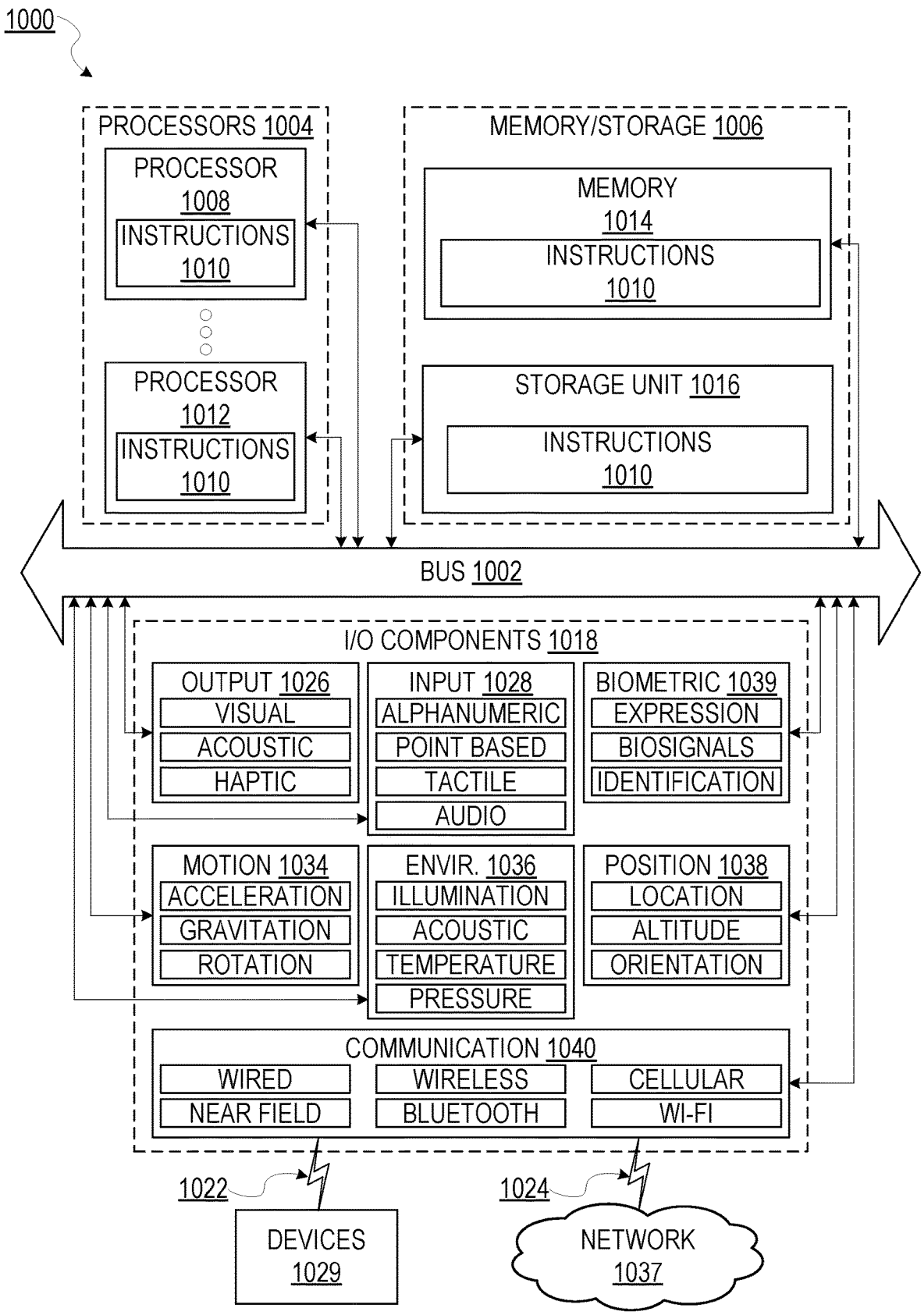
FIG. 10 is a block diagram illustrating components of a machine able to read instructions from a machine-readable medium (e.g., a machine-readable storage medium) and perform any one or more of the methodologies discussed herein, according to example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines 1000 that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1008 and a processor 1012 that may execute the instructions 1010. The term "processor" is intended to include multi-core processors 1004 that may comprise two or more independent processors 1004 (sometimes referred to as "cores") that may execute instructions 1010 contemporaneously. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine 1000. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1039, motion components 1034, environmental components 1036, or position components 1038 among a wide array of other components. For example, the biometric components 1039 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1037 or devices 1029 via coupling 1024 and coupling 1022, respectively. For example, the communication components 1040 may include a network interface component or other suitable device to interface with the network 1037. In further examples, communication components 1040 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1029 may be another machine 1000 or any of a wide variety of peripheral devices (e.g., a peripheral device coupled via a USB).

Moreover, the communication components 1040 may detect identifiers or include components operable to detect identifiers. For example, the communication components 1040 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying transitory or non-transitory instructions 1010 for execution by the machine 1000, and includes digital or analog communications signals or other intangible medium to facilitate communication of such instructions 1010. Instructions 1010 may be transmitted or received over the network 1037 using a transitory or non-transitory transmission medium via a network interface device and using any one of a number of well-known transfer protocols.

"CLIENT DEVICE" in this context refers to any machine 1000 that interfaces to a communications network 1037 to obtain resources from one or more server systems or other client devices 102. A client device 102 may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network 1037.

"COMMUNICATIONS NETWORK" in this context refers to one or more portions of a network 1037 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1307 or a portion of a network 1037 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message 300 that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message 300 is transitory.

"MACHINE-READABLE MEDIUM" in this context refers to a component, device, or other tangible media able to store instructions 1010 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store instructions 1010. The term "machine-readable medium" shall also be taken to include any medium, or combination of multiple media, that is capable of storing instructions 1010 (e.g., code) for execution by a machine 1000, such that the instructions 1010, when executed by one or more processors 1004 of the machine 1000, cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1004) may be configured by software (e.g., an application 916 or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor 1004 or other programmable processor 1004. Once configured by such software, hardware components become specific machines (or specific components of a machine) uniquely tailored to perform the configured functions and are no longer general-purpose processors 1004. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1004 configured by software to become a special-purpose processor, the general-purpose processor 1004 may be configured as respectively different special-purpose processors (e.g., comprising different hardware components) at different times. Software accordingly configures a particular processor or processors 1004, for example, to constitute a particular hardware component at one instance of time and to constitute a different hardware component at a different instance of time.

Hardware components can provide information to, and receive information from, other hardware components.

Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 1004 that are temporarily configured (e.g., by software) or permanently configured to perform the relevant operations. Whether temporarily or permanently configured, such processors 1004 may constitute processor-implemented components that operate to perform one or more operations or functions described herein. As used herein, "processor-implemented component" refers to a hardware component implemented using one or more processors 1004. Similarly, the methods described herein may be at least partially processor-implemented, with a particular processor or processors 1004 being an example of hardware. For example, at least some of the operations of a method may be performed by one or more processors 1004 or processor-implemented components. Moreover, the one or more processors 1004 may also operate to support performance of the relevant operations in a "cloud computing" environment or as a "software as a service" (SaaS). For example, at least some of the operations may be performed by a group of computers (as examples of machines 1000 including processors 1004), with these operations being accessible via a network 1037 (e.g., the Internet) and via one or more appropriate interfaces (e.g., an API). The performance of certain of the operations may be distributed among the processors 1004, not only residing within a single machine 1000, but deployed across a number of machines 1000. In some example embodiments, the processors 1004 or processor-implemented components may be located in a single geographic location (e.g., within a home environment, an office environment, or a server farm). In other example embodiments, the processors 1004 or processor-implemented components may be distributed across a number of geographic locations.

"PROCESSOR" in this context refers to any circuit or virtual circuit (a physical circuit emulated by logic executing on an actual processor 1004) that manipulates data values according to control signals (e.g., "commands," "op codes," "machine code,", etc.) and which produces corresponding output signals that are applied to operate a machine 1000. A processor 1004 may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 1004 may further be a multi-core processor having two or more independent processors (sometimes referred to as "cores") that may execute instructions 1010 contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
receiving, by one or more processors, via a graphical user interface, a selection of one or more fields that characterize utilization of user data by an application feature;
determining, by the one or more processors, that the utilization of the user data is privacy compliant based on a correspondence between the selected one or more fields associated with the application feature and a set of fields of other application features that were previously approved to utilize the user data in a way that matches the utilization of the user data by the application feature; and
generating, by the one or more processors, for display in the graphical user interface, an approval status indicating that the utilization of the user data is privacy compliant.

2. The method of claim 1, further comprising:
receiving input, from a user device, that includes identification of the application feature that utilizes the user data collected from a plurality of users of an application, the user data comprising images or videos captured by the plurality of users; and
generating for display in the graphical user interface, a plurality of fields that characterize utilization of the user data in response to receiving the input from the user device, the selection of the one or more fields being received from the displayed plurality of fields.

3. The method of claim 1, further comprising:
storing a unique identifier of the application feature;
associating the selected one or more fields and the application feature associated with the unique identifier; and
storing the user data on storage locations managed by a plurality of third-party storage sources, wherein the graphical user interface comprises an option to add a resource that identifies one or more of the plurality of third-party storage sources.

4. The method of claim 3, wherein the user data comprises current locations of a plurality of users, further comprising:
receiving from a user device the unique identifier; and
retrieving the selected one or more fields for display in the graphical user interface based on the unique identifier.

5. The method of claim 1, further comprising:
generating a first risk score for the application feature in response to determining that a number of the other application features that were previously approved to utilize the user data in the way that matches the utilization of the user data by the application feature exceeds a certain threshold; and
generating a second risk score for the application feature in response to determining that the number of the other application features that were previously approved to utilize the user data in the way that matches the utilization of the user data by the application feature fall below the certain threshold, the second risk score being greater than the first risk score.

6. The method of claim 1, wherein the selected one or more fields comprise a first field identifying a storage location of the user data, a second field identifying a data type of the user data utilized by the application feature, a third field identifying use of the user data by the application feature, and a fourth field identifying a retention period for the user data, further comprising assigning a priority value to an individual field of the one or more fields that characterizes the utilization of the user data, wherein a risk score is computed based on the assigned priority value of the individual field.

7. The method of claim 1, wherein determining whether the utilization of the user data is privacy compliant comprises:
generating a first message to a privacy review user identifying the application feature, the first message including the selected one or more fields; and
receiving input from the privacy review user via the graphical user interface indicating whether the utilization of the user data is privacy compliant.

8. The method of claim 7, further comprising:
storing, in a database, an approval status indicating whether utilization of the user data is privacy compliant, the approval status being associated with the application feature that utilizes the user data; and
modifying the approval status stored in the database based on the input received from the privacy review user.

9. The method of claim 1, further comprising receiving additional input from a user device via the graphical user interface that adds a new field that characterizes utilization of the user data, wherein the application feature is part of or is used by a messaging application.

10. The method of claim 1, further comprising:
locking the selected one or more fields associated with the application feature to prevent modification of the selected one or more fields in response to receiving a request to review the utilization of the user data by the application feature; and
in response to locking the selected one or more fields, generating for display a date and time at which the selected one or more fields have been locked.

11. The method of claim 10, wherein the graphical user interface includes a plurality of simultaneously displayed portions, wherein the date and time at which the selected one or more fields have been locked are displayed together with the plurality of simultaneously displayed portions, the portions including:
a first portion that includes information identifying a given user of a user device and information about the application feature;
a second portion that includes a plurality of menus representing the plurality of fields that characterize utilization of user data; and
a third portion that includes the approval status indicating whether the utilization of the user data is privacy compliant, the approval status including a plurality of simultaneously displayed indicators including a first indicator indicating incomplete approval status, a second indicator indicating in progress approval status, and a third indicator indicating complete approval status.

12. The method of claim 1, further comprising storing in a database a plurality of application features, each of the plurality of application features being associated with a given set of selected one or more fields from the plurality of fields and a corresponding approval status indicating whether utilization of the user data based on the given set of the selected one or more fields is privacy compliant.

13. The method of claim 12, further comprising:
identifying a plurality of application features for which the approval status indicates that utilization of the user data has been previously approved, wherein the other application features are included among the plurality of application features;
retrieving a list of combinations of fields of the identified plurality of application features for which the approval status indicates that utilization of the user data has been previously approved;
comparing the selected one or more fields that characterize the utilization of the user data by the application feature to the list of combinations of fields of the identified plurality of application features; and
determining that the utilization of the user data is privacy compliant in response to determining that more than a threshold quantity of fields of the selected one or more fields match the combinations of fields of the identified plurality of application features.

14. The method of claim 13, further comprising computing a risk score for the application feature, the risk score indicating a likelihood that utilization of the user data is privacy compliant.

15. The method of claim 14, wherein the risk score is computed based on a determination of how many of the given set of selected one or more fields of the identified plurality of application features matches the selected one or more fields that characterize the utilization of the user data by the application feature.

16. The method of claim 14, wherein the likelihood that the utilization of the user data is privacy compliant indicated by the risk score is greater than a privacy compliance threshold when a retention period specified by the selected one or more fields is less than a retention period threshold.

17. The method of claim 14, wherein determining whether the utilization of the user data is privacy compliant comprises:
determining whether the risk score computed for the application corresponds to a threshold; and
automatically approving the utilization of the user data as being privacy compliant in response to determining that the risk score corresponds to the threshold.

18. The method of claim 12, further comprising generating a list representing privacy compliance based on the plurality of application features stored in the database by aggregating the given set of selected one or more fields associated with the plurality of application features.

19. A system comprising:
a processor configured to perform operations comprising:
receiving, via a graphical user interface, a selection of one or more fields that characterize utilization of user data by an application feature;
determining that the utilization of the user data is privacy compliant based on a correspondence between the selected one or more fields associated with the application feature and a set of fields of other application features that were previously approved to utilize the user data in a way that matches the utilization of the user data by the application feature; and
generating for display in the graphical user interface, an approval status indicating that the utilization of the user data is privacy compliant.

20. A non-transitory machine-readable storage medium that includes instructions that, when executed by one or more processors of a machine, cause the machine to perform operations comprising:
- receiving, via a graphical user interface, a selection of one or more fields that characterize utilization of user data by an application feature;
- determining that the utilization of the user data is privacy compliant based on a correspondence between the selected one or more fields associated with the application feature and a set of fields of other application features that were previously approved to utilize the user data in a way that matches the utilization of the user data by the application feature; and
- generating for display in the graphical user interface, an approval status indicating that the utilization of the user data is privacy compliant.

* * * * *